(12) United States Patent
Kawahata et al.

(10) Patent No.: US 6,890,198 B2
(45) Date of Patent: May 10, 2005

(54) CARD CONNECTOR DEVICE HAVING DETECTING SWITCH FOR DETECTING MOUNTING OF CARD

(75) Inventors: Takashi Kawahata, Miyagi-ken (JP); Takeshi Murayama, Miyagi-ken (JP)

(73) Assignee: ALPS Electric Co., Ltd., Tokyo (JP)

( * ) Notice: Subject to any disclaimer, the term of this patent is extended or adjusted under 35 U.S.C. 154(b) by 0 days.

(21) Appl. No.: 10/818,605

(22) Filed: Apr. 5, 2004

(65) Prior Publication Data

US 2004/0209506 A1 Oct. 21, 2004

(30) Foreign Application Priority Data

Apr. 16, 2003 (JP) ........................................ 2003-111779
Apr. 16, 2003 (JP) ........................................ 2003-111801

(51) Int. Cl.[7] .............................................. H01R 29/00
(52) U.S. Cl. ..................................................... 439/188
(58) Field of Search ................................. 439/188, 630

(56) References Cited

U.S. PATENT DOCUMENTS 6,399,906 B1 * 6/2002 Sato et al. .................. 439/188
6,425,775 B1   7/2002 Chang et al.
6,488,528 B2 * 12/2002 Nishioka ..................... 439/489
6,638,087 B1 * 10/2003 Takada et al. .............. 439/188
6,719,577 B2 *  4/2004 Nogami ...................... 439/188
2003/0216074 A1 * 11/2003 Takada et al. .............. 439/188

* cited by examiner

*Primary Examiner*—Tho D. Ta
(74) *Attorney, Agent, or Firm*—Beyer Weaver & Thomas LLP

(57) ABSTRACT

There is provided a card connector device in which the length and the width thereof can be reduced. The connector device includes an insertion portion 40 into which a card 1 having a notch portion 2 is inserted, and a detecting switch 21 for detecting that the card 1 inserted into the insertion portion 40 is mounted at a predetermined card mounting position, wherein the detecting switch 21 is arranged so that at least a portion of the detecting switch 21 is positioned in a space defined by the notch portion 2 of the card 1 mounted at the predetermined card mounting position.

17 Claims, 5 Drawing Sheets

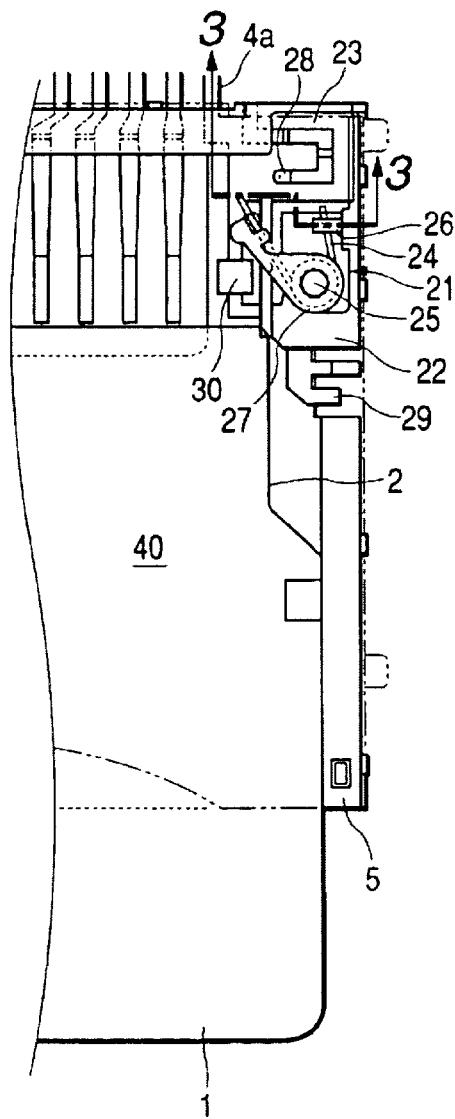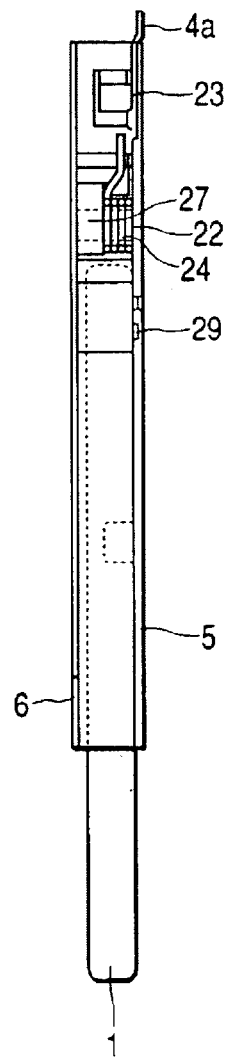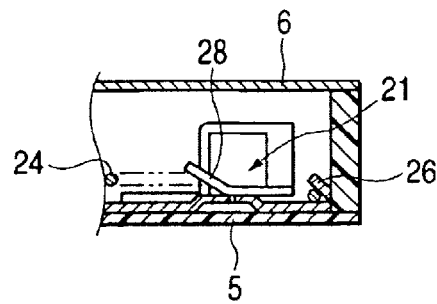

CARD CONNECTOR DEVICE HAVING DETECTING SWITCH FOR DETECTING MOUNTING OF CARD

BACKGROUND OF THE INVENTION

1. Field of the Invention

The present invention relates to a card connector device comprising a detecting switch for detecting that a card, such as a small-sized memory card, is inserted and mounted at a predetermined card mounting position.

2. Description of the Related Art

There has been proposed a conventional card connector device including a card recognizing switch, i.e., a detecting switch for detecting that the card is mounted at a predetermined card mounting position (for example, see Patent Document 1).

In addition, there has been proposed another conventional card connector device in which a detecting switch having the same function as that of the aforementioned card-recognizing switch is provided on the side of a card inserting portion.

[Patent Document 1]

Japanese Unexamined Patent Application Publication No. 2001-135424 (FIGS. 2 and 4)

According to the conventional technique disclosed in the patent document 1, since the detecting switch is provided inside the connector device, the longitudinal dimension of the connector device is increased. Thus, it is not possible to miniaturize the connector device. In addition, the conventional connector device having the detecting switch on the side of the card inserting portion has a drawback in that the width of the connector device is increased. Thus, it is not possible to miniaturize the connector device.

SUMMARY OF THE INVENTION

Accordingly, the present invention is designed to solve the above problems, and it is an object of the present invention to provide a card connector device of which the length and width can be shortened.

To achieve this object, there is provided a card connector device comprising: an insertion portion into which a card having a notch portion is inserted; and a detecting switch for detecting that the card inserted into the insertion portion is mounted at a predetermined card mounting position, wherein the detecting switch is disposed so that at least a portion of the detecting switch is positioned in a space defined by the notch portion of the card mounted at the predetermined card mounting position.

In the card to be inserted, the notch portion is formed in the vicinity of the front end thereof, i.e., at the end that is positioned inside the connector device when the card is inserted into the connector device. Therefore, according to the present invention, the notch portion of the card is employed as a space for receiving the detecting switch.

That is, according to the present invention, the detecting switch is disposed so that at least a portion of the detecting switch is positioned in the space defined by the notch portion of the card mounted at the predetermined card mounting position. With this construction, it is possible to minimize the space required for arrangement of the detecting switch, and thus to reduce the length and the width of the connector device.

In addition, according to the present invention, the detecting switch includes a movable contact member composed of a torsion coil spring.

In this way, the connector device of the present invention can be inexpensively manufactured compared to a case in which the movable contact member is composed of a plate spring. Therefore, it is possible to reduce the manufacturing costs of the connector device.

Furthermore, according to the present invention, the detecting switch includes a first stationary contact member always electrically connected to the torsion coil spring, and a second stationary contact member selectively electrically connected to the torsion coil spring. The first stationary contact member and the second stationary contact member are integrally formed with each other before a housing constituting the insertion portion is insert-molded, and after the insert molding, the first stationary contact member and the second stationary contact member are separated from each other by an aperture formed by cutting.

In this construction as described above, when the card is not mounted at the predetermined card mounting position, the torsion coil spring is not electrically connected to the second stationary contact member. Therefore, the first stationary contact member is not electrically connected to the secondary contact member, and thus it is detected that the card is not mounted at the predetermined card mounting position. In addition, when the card is mounted at the predetermined card mounting position, the torsion coil spring is electrically connected to the second stationary contact member. Accordingly, the first stationary contact member is electrically connected to the secondary contact member, and thus it is detected that the card is mounted at the predetermined card mounting position. That is, it is possible to reliably detect the card mounted at the predetermined card mounting position through the torsion coil spring.

Moreover, according to the present invention, the connector device further comprises an actuator that is rotated by inserting and extracting operations of the card inserted into the insertion portion and that makes the torsion coil spring bent.

In the above construction, if the card is pressed into the vicinity of the predetermined card mounting position, the actuator starts to rotate, and the torsion coil spring is bent by the actuator. Furthermore, if the card is pressed to the predetermined card mounting position, the torsion coil spring is electrically connected to the second stationary contact member by the rotation of the actuator. Accordingly, the first stationary contact member is electrically connected to the secondary contact member by the torsion coil spring, and thus it is detected that the card is mounted at the predetermined card mounting position. That is, it is possible to selectively electrically connect the torsion coil spring to the second stationary contact member by the rotation of the actuator.

In addition, according to the present invention, the connector device further comprises a raised piece that is always electrically connected to the second stationary contact member and is selectively connected to the torsion coil spring.

In the above construction, the connector device includes the raised piece corresponding to the entire thickness of the torsion coil spring. Therefore, the first stationary contact member and the second stationary contact member can be formed of simple flat members, thereby easily manufacturing the first and second stationary contact members.

Furthermore, according to the present invention, the connector device further comprises an extracting mechanism for extracting the card inserted into the insertion portion, wherein the card includes recessed portions, wherein the extracting mechanism includes a slider that moves in the inserting and extracting directions of the card and presses the card out, and an urging member for urging the slider toward the extracting direction, wherein the slider includes a protruding portion engaging with one of the recessed portion of the card, is disposed so that disengagement of the protruding portion from the recessed portion is restricted at the predetermined card mounting position, and is disposed so that the protruding portion disengages from the recessed portion at a predetermined card extracting position, and wherein the connector device further comprises an elastic portion for urging the slider in a direction in which the protruding portion of the slider engages with the recessed portion of the card at the predetermined card extracting position.

With the above construction, in a state where the card is mounted at the predetermined card mounting position, the protruding portion of the slider engages with the recessed portion of the card. In addition, since the disengagement of the protruding portion from the recessed portion is restricted in the slider, it is possible to firmly keep the card in the mounting state. Furthermore, the slider is provided with the protruding portion, thereby not increasing the number of components. Moreover, the urging force for allowing the protruding portion of the slider to engage with the recessed portion of the card can be provided by the elastic portion formed on the cover member.

In addition, according to the present invention, a slider receiving portion for receiving the slider is formed on the side of the insertion portion, and an outer wall constituting the slider receiving portion has a notch portion for allowing the elastic portion to press the slider.

With the above construction, it is possible to reliably apply the elastic force of the elastic portion to the slider through a gap formed by the notch portion provided on the outer wall of the slider receiving portion.

Also, according to the present invention, the slider includes a sliding boss that is positioned opposite to the protruding portion thereof, slides on the outer wall of the slider receiving portion, and is urged by the elastic portion at the predetermined card extracting position.

In the above construction, when the slider moves according to the movement of the card toward the predetermined card mounting position, the sliding boss provided on the slider slides on the outer wall of the slider receiving portion. Therefore, it is possible to smoothly move the slider. That is, it is possible to smoothly move the card to the predetermined card mounting position.

Furthermore, when the card is at the predetermined card extracting position, the sliding boss of the slider is pressed down by the elastic portion. Therefore, when the force to withdraw the card is not applied, the protruding portion of the slider can engage with the recessed portion of the card by the urging force of the elastic portion, and thus it is possible to prevent the card from being separated from the insertion portion of the card due to vibration.

Moreover, according to the present invention, the connector device further comprises a metal cover member for covering the insertion portion, wherein the elastic portion is composed of a cantilever-shaped cut and raised piece that is formed by cutting and raising a portion of the cover member.

In the construction as described above, since the elastic portion is provided on the cover member, the number of the components is not increased. That is, it is possible to firmly keep the card at the predetermined card mounting position without increasing the number of components. In addition, it is possible to manufacture the cover member simultaneously with the elastic portion, thereby suppressing the number of manufacturing processes.

BRIEF DESCRIPTION OF THE DRAWINGS

FIG. 1 is a view illustrating when a card is inserted into a card connector device according to an embodiment of the present invention, in which

FIG. 2 is a view similar to FIG. 1 illustrating when the card is inserted into the connector device, in which FIG. 2A is a plan view of major parts of the connector device, with the cover member being removed, and FIG. 2B is a right side view of the connector device;

FIG. 3 is an enlarged cross-sectional view taken along the line 3—3 of FIG. 2;

FIG. 4 is a view illustrating when the card is mounted at a predetermined card mounting position in the connector device according to the embodiment of the present invention, in which

FIG. 6 is a view illustrating when the card is extracted from the connector device according to the embodiment of the present invention, in which FIG. 6A is a plan view of the connector device, with the cover member being removed, and FIG. 6B is a right side view of the connector device.

DESCRIPTION OF THE PREFERRED EMBODIMENT

Preferred embodiments of a card connector device according to the present invention will now be described with reference to the accompanying drawings.

Figures 1A, 1B:
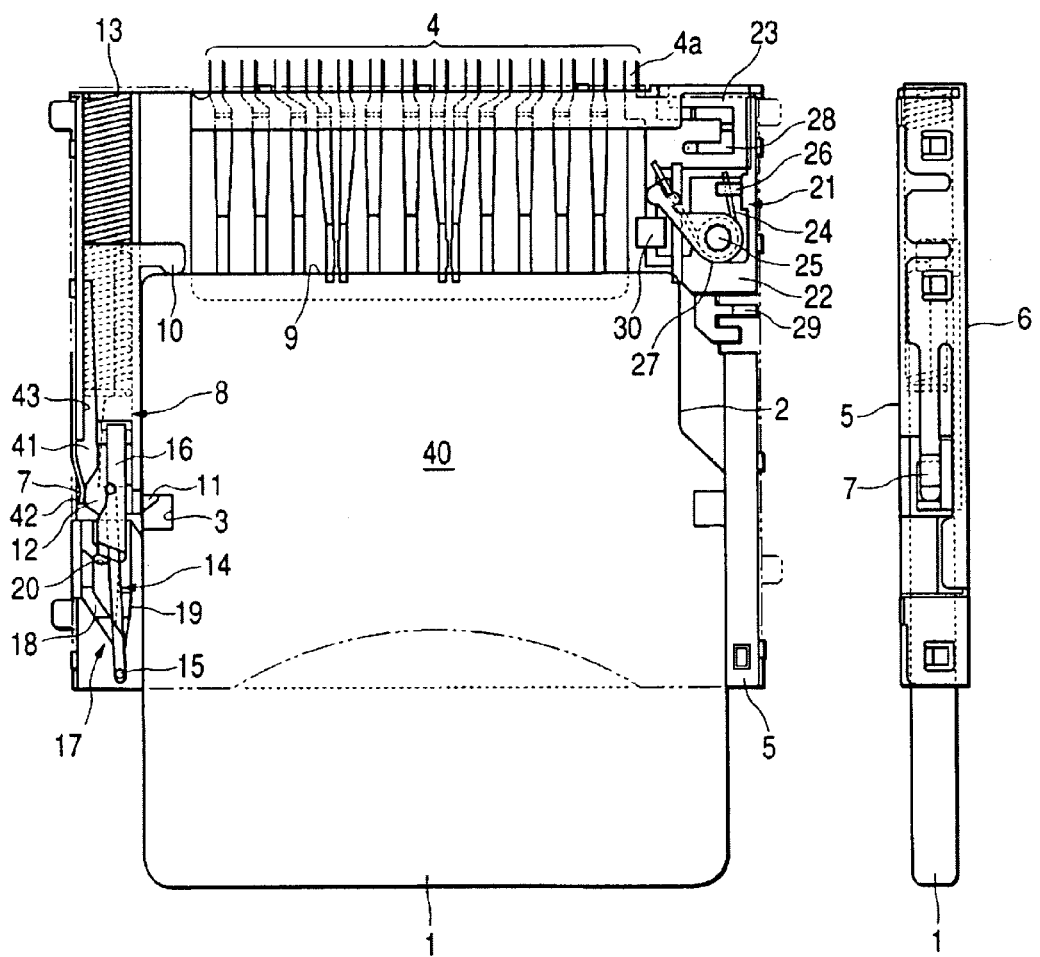
FIG. 1A is a plan view of the connector device, with a cover member for covering a card inserting portion being removed.
FIG. 1B is a left side view of the connector device.

FIG. 1 is a view illustrating a state in which a card is inserted into a card connector device according to one preferred embodiment of the present invention, in which FIG. 1A is a plan view showing a state in which a cover member for covering a card receiving portion is removed, and FIG. 1B is a left side view of thereof.

[Card Usable in the Present Embodiment]

A card employed in the present embodiment is, for example, a card 1 composed of a small-sized memory card, and has a notch portion 2 at the right corner of a front end 9 thereof, and a recessed portion 3 on the left edge, as shown in FIG. 1A. In addition, the card 1 is provided with contact members (not shown) that are utilized when transmitting and receiving signals.

[Construction of the Present Embodiment]

As shown in FIGS. 1A and 1B, the connector device of the present invention includes a housing 5 in which terminal members 4 for contacting with the contact members of the card 1 are embedded by insert molding, and a metal cover member 6 for covering the housing 5. A cavity surrounded by the housing 5 and the cover member 6 forms an insertion portion 40 of the card 1.

The cover member 6 includes an elastic portion 7 on the left surface thereof. The elastic portion 7 is composed of a cantilever-shaped cut and raised piece that is formed by cutting and raising a portion of the cover member 6.

Also, the connector device of the present embodiment includes an extracting mechanism for extracting the card 1 inserted into the insertion portion 40, for example, on the left side of the insertion portion 40. The extracting mechanism includes a slider 8 that moves in the inserting and extracting directions of the card 1 and that presses out the card 1, an urging member 13 for urging the slider 8 toward the extracting direction, a sliding member 14, a pressing member 16, and a heart-shaped cam groove 17.

The slider 8 includes an engaging portion 10 engaging with the front end 9 of the card 1, a protruding portion 11 arranged so as to engage with the recessed portion 3 of the card 1, and a sliding boss 12 disposed opposite to the protruding portion 11.

The slider 8 is accommodated in a slider receiving portion 41 formed on the left side of the insertion portion 40, and is arranged so that the movement of the protruding portion 11 to disengage from the recessed portion 3 is restricted at a predetermined card mounting position in which the contact members of the card 1 contact with the terminal members 4. In addition, the slider 8 is arranged so that the protruding portion 11 is disengaged from the recessed portion 3 at a predetermined card extracting position in which the card 1 is extractible.

In addition, FIG. 1 shows a state in which the card 1 is inserted. However, a state in which the card 1 is returned to the predetermined card extracting position is equal to that of FIG. 1.

An outer wall 43 forming the left side of a slider receiving portion 41 has a notch portion 42 for allowing the elastic portion 7 to press the slider 8 at the predetermined extracting position of the card 1.

Furthermore, the sliding boss 12 of the slider 8 can slide on the outer wall 43 of the slider receiving portion 41, and is urged by the elastic portion 7 at the predetermined card extracting position. That it, the elastic portion 7 urges the sliders 8 through the sliding boss 12 in a direction in which the protruding portion 11 of the slider 8 engages with the recessed portion 3 of the card 1, at the predetermined card extracting position.

The aforementioned sliding member 14 has one end that is slidably coupled to the slider 8, and the other end thereof is provided with a pin 15 extending toward the rear surface of FIG. 1A.

The pin 15 of the sliding member 14 engages with the heart-shaped cam groove 17. The heart-shaped cam groove 17 has a forward path 18, a backward path 19, and a locking portion 20 positioned at the boundary between the forward path 18 and the backward path 19 for locking the pin 15 of the sliding member 14.

The pressing member 16 is coupled to the slider 8 to press the sliding member 14 toward the rear surface of FIG. 1A. In other words, pressing force is applied to the sliding member 14 so that the pin 15 of the sliding member 14 slides on the heart-shaped cam groove 17.

FIG. 2 is similar to FIG. 1, in which FIG. 2A is a plan view showing major parts of the connector device, with the cover member being removed, and FIG. 2B is a right side view of the connector device. FIG. 3 is an enlarged cross-sectional view taken along the line 3—3 of FIG. 2A.

Figure 4A:
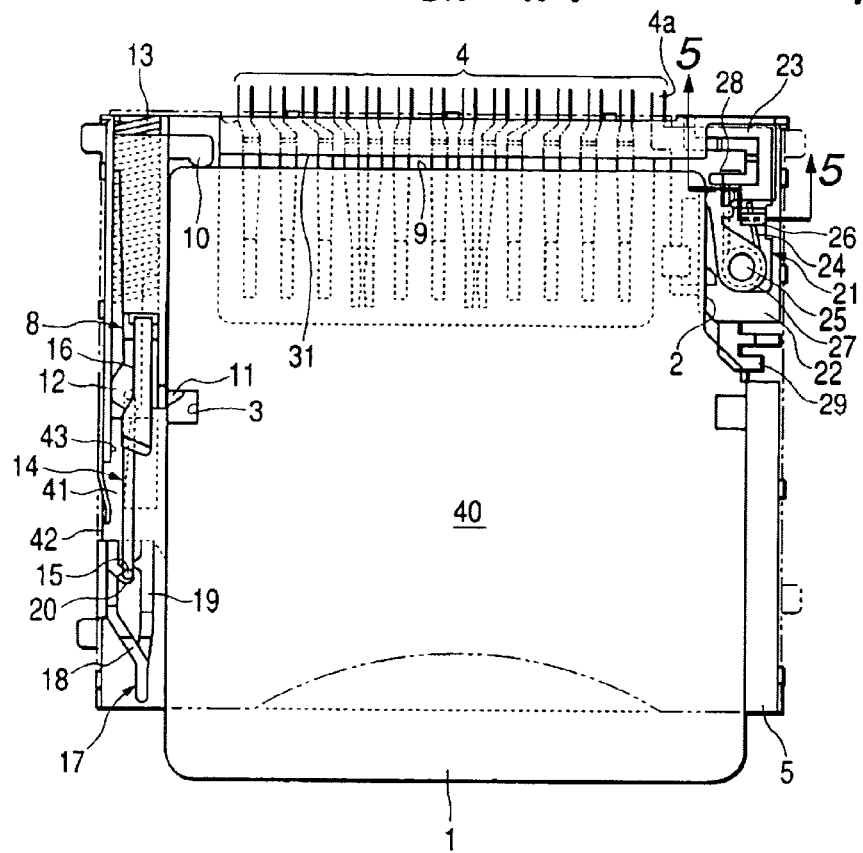
FIG. 4A is a plan view of the connector device, with the cover member being removed.
Figure 4B:
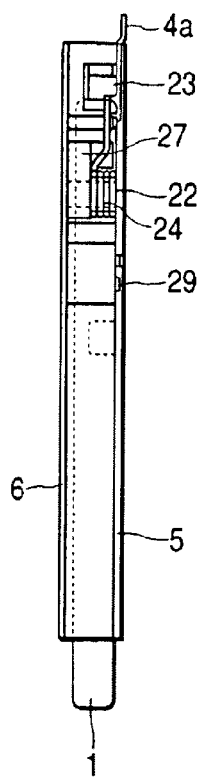
FIG. 4B is a right side view of the connector device.
Figure 5:
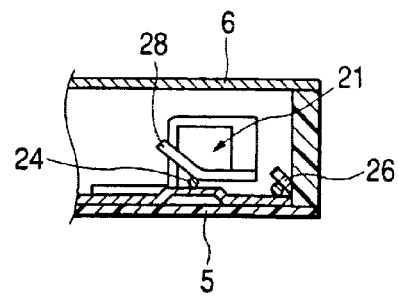
FIG. 5 is an enlarged cross-sectional view taken along the line 5—5 of FIG. 4A.

FIG. 4 is a view illustrating when a card is mounted at a predetermined card mounting position in the connector device according to the present invention, in which FIG. 4A is a plan view of the connector device with the cover member being removed, and FIG. 4B is a right side view of the connector device. FIG. 5 is an enlarged cross-sectional view taken along the line 5—5 of FIG. 4B.

Figure 6:
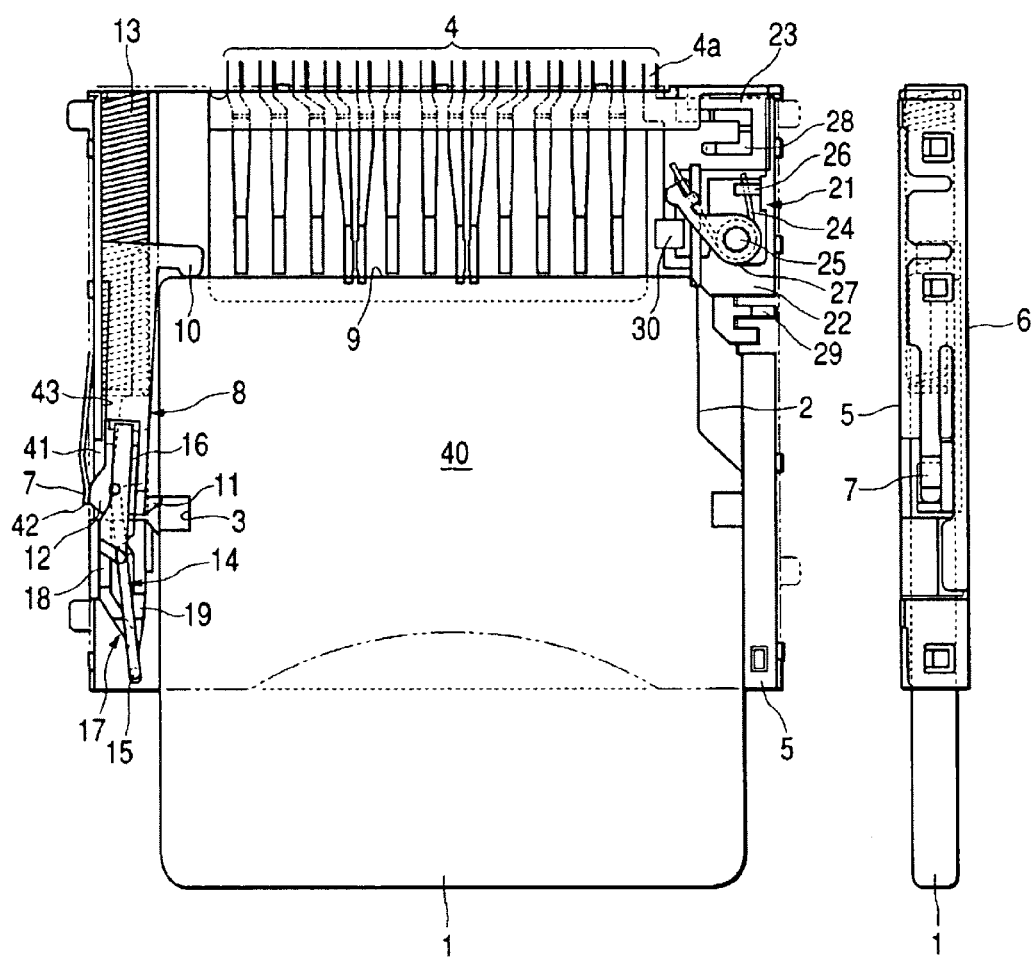

FIG. 6 is a view illustrating when the card is extracted from the connector device according to the present invention, in which FIG. 6A is a plan view of the connector device, with the cover member being removed, and FIG. 6B is a right side view of the connector device.

Figure 7:
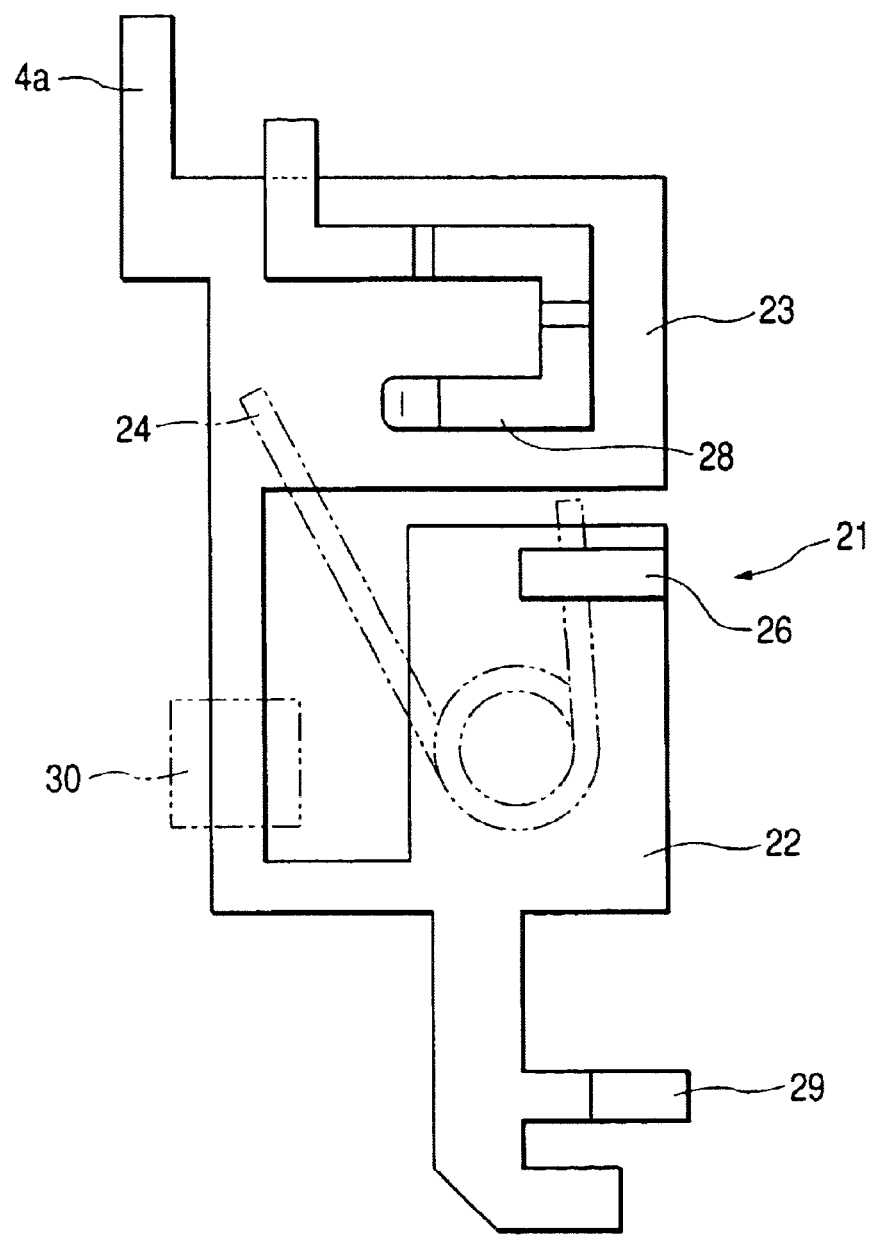
FIG. 7 is a plan view illustrating a state before a first stationary contact member and a second stationary contact member, which are included in the connector device, are insert-molded.

FIG. 7 is a plan view illustrating a state before a first stationary contact member and a second stationary contact member are insertion-molded.

[Construction of Detecting Switch]

As shown in FIGS. 2 to 5, the connector device according to the present invention includes a detecting switch 21 for detecting that the card 1 is mounted at a predetermined card mounting position. As shown in FIG. 4A, the detecting switch 21 is arranged so that at least a portion of the detecting switch 21 is positioned in the space defined by the notch portion 2 of the card 1 mounted at the predetermined card mounting position.

The detecting switch 21 includes a movable contact member composed of a torsion coil spring 24, a first stationary contact member 22 always electrically connected to the torsion coil spring 24, and a second stationary contact member 23 selectively electrically connected to the torsion coil spring 24.

As shown in FIG. 7, the first stationary contact member 22 and the second stationary contact member 23 are integrally formed with each other before the housing 5 constituting the insertion portion 40 is insert-molded. After the insert molding, the first stationary contact member 22 and the second stationary contact member 23 are separated from each other by an aperture 30 formed by cutting.

The torsion coil spring 24 is fitted to a shaft 25, and the lower end of the torsion coil spring 24 is caught in a spring shoe 26, for example, integrally formed with the first stationary contact member 22. That is, the torsion coil spring 24 is always electrically connected to the first stationary contact member 22. In addition, the upper end of the torsion coil spring 24 is caught in an actuator 27 rotatably fitted to the shaft 25. That is, the torsion coil spring 24 is bent by the rotation of the actuator 27, and its upper end can come into contact with the second stationary contact member 23.

Also, as shown in FIGS. 3 and 5, a raised piece 28 that is integrally formed with the second stationary contact member 23 selectively contacts with the upper end of the torsion coil spring 24. FIG. 3 shows a state in which the upper end of the torsion coil spring 24 is separated from the raised piece 28, and FIG. 5 shows a state in which the upper end of the torsion coil spring 24 comes into contact with the raised piece 28.

[Insertion of Card]

As shown in FIG. 1, when the card 1 is inserted into the insertion portion of the present embodiment, the protruding portion 11 of the slider 8 engages with the recessed portion 3 of the card 1 disposed on the left edge. At that time, the front end 9 of the card 1 engages with a tapered portion formed immediately in front of the protruding portion 11, so that the slider 8 slides in a counterclockwise direction. At that time, the sliding boss 11 of the slider 8 is urged by the elastic portion 7. In this way, the fluctuation of the slider 8 is restricted, and thus the protruding portion 11 of the slider 8 engages with the recessed portion 3 of the card 1 by the movement of the card 1.

If the card 1 is pushed further, the front end 9 of the card 1 engages with the engaging portion 10 of the slider 8, so that the slider 8 moves into the connector device together with the card 1 against the urging force of the urging member 13. The sliding member 14 pressed by the pressing member 16 moves integrally with the slider 8, and the pin 15 of the sliding member 14 slides on the forward path 18 of the heart-shaped cam groove 17.

The front end 9 of the card 1 is pushed until it abuts the wall 31 of the connector device as shown in FIG. 4A. At that time, if the pressing force applied to the card 1 is released, the card 1 is slightly pushed and returned by the urging force of the urging member 13, and the pin 15 of the sliding member 14 engages with the locking portion 20 of the heart-shaped cam groove 17. In other words, the slider 8 is locked so as not to move toward the extracting direction of the card 1. As shown in FIGS. 4A and 4B, the card 1 is maintained at the predetermined card mounting position.

During the insertion of the card 1, the actuator 27 constituting the detecting switch 21 is rotated by the front end 9 of the card 1, and thus the torsion coil spring 24 comes into contact with the raised piece 28, as shown in FIG. 5. By the bending deformation of the torsion coil spring 24 due to the rotation of the actuator 27, a portion of the torsion coil spring 24 and the actuator 27 are accommodated in the space defined by the notch portion 2 of the card 1, as shown in FIG. 4A. In addition, the torsion coil spring 24 comes into contact with the raised piece 28, and thus the first stationary contact member 22 is electrically connected to the second stationary contact member 23 via the torsion coil spring 24. Then, signals are outputted from a terminal 29 connected to the first stationary contact member 22 and a terminal 4a connected to the second stationary contact member 23. In other words, the detecting switch 21 turns on, and it detects that the card 1 is mounted at the predetermined card mounting position.

As such, if the card 1 is mounted at the predetermined card mounting position, the terminal members 4 of the connector device come into contact with contact members (not shown) of the card 1 to transmit or receive signals to or from the card 1.

In addition, when the card 1 is mounted at the predetermined card mounting position, the sliding boss 12 of the slider 8 abuts the outer wall 43 forming a rigid body of the connector device, so that the movement of the slider 8 is restricted in a direction in which the protruding portion 11 would disengage from the recessed portion 3 of the card 1, as shown in FIG. 4A. Accordingly, the card 1 is firmly maintained in the connector device so as not to be extracted therefrom.

[Extraction of Card]

As described above, when the card 1 mounted at the predetermined card mounting position is extracted from the connector device, the card 1 is pushed further into the device initially. Then, the pin 15 of the sliding member 14 is disengaged from the locking portion 20 of the heart-shaped cam groove 17, and the pin 15 of the sliding member 14 moves on the backward path 19 of the heart-shaped cam groove 17 by the urging force of the urging member 13. Accordingly, the card 1 is press out toward the extracting direction by the engaging portion 10 of the slider 8, and the card 1 returns to the predetermined card extracting position.

During the above processes, the actuator 27 constituting the detecting switch 21 rotates in the counterclockwise direction by the force of the torsion coil spring 24, according to the movement of the card 1 toward the extracting direction. Then, the torsion coil spring 24 is detached from the raised piece 28. In other words, the torsion coil spring 24 is detached from the raised piece 28, and thus the first stationary contact member 22 is disconnected from the second stationary contact member 23, thereby turning off the detecting switch 21. Accordingly, it is detected that the card 1 does not exist at the predetermined card mounting position.

[Withdrawal of Card]

As described above, when the card 1 extracted up to the predetermined card extracting position is withdrawn towards the outside of the connector device, as shown in FIG. 6, the protruding portion 11 of the slider 8 is pressed in the left direction of FIG. 6A by the edge of the recessed portion 3 of the card 1, so that the slider 8 slides. At that time, the sliding boss 12 of the slider 8 protrudes slightly outward from the notch portion 42 against the urging force of the elastic portion 7 of the cover member 6. In other words, when the card 1 is withdrawn from the predetermined card extracting position, the protruding portion 11 of the slider 8 can be deformed so as to disengage from the recessed portion 3 of the card 1.

When the card 1 is extracted, the sliding boss 12 is pressed toward the slider receiving portion 41 by the urging force of the elastic portion 7 of the cover member 6, and the slider 8 returns into the slider receiving portion 41. In this way, the connector device according to the present embodiment is on standby.

In the connector device of the present embodiment constructed as described above, as shown in FIG. 4A, in a state in which the card 1 is mounted at the predetermined card mounting position, the protruding portion 11 of the slider 8 engages with the recessed portion 3 of the card 1, and the movement of the slider 8 is restricted in a direction in which protruding portion 11 is disengaged from the recessed portion 3. Therefore, it is possible to firmly hold the card 1 in the mounting state. Accordingly, it is possible to prevent the card 1 from being withdrawn by mistake. In addition, sine the slider 8 is provided with the protruding portion 11, it is possible to reduce manufacturing costs without increasing the number of components.

The urging force to urge the protruding portion 11 of the slider 8 in a direction in which the protruding portion 11 engages with the recessed portion 3 of the card 1 can be reliably provided by the elastic portion 7 formed on the cover member 6. The elastic portion 7 is provided on the cover member 6, and can be simultaneously manufactured with the cover member 6, thereby not increasing the number of components. Therefore, it is possible to suppress an increase in the number of components. In other words, it is possible to keep the card 1 at the predetermined card mounting position without increasing the number of components. Accordingly, the manufacturing costs may be reduced.

In addition, the urging force of the elastic portion 7 is reliably applied to the slider 8 through a gap formed by the notch portion 42 provided in the outer wall 43 of the slider receiving portion 41, and thus a connector device having high reliability can be obtained with a simple structure.

Furthermore, when the slider 8 moves according to the movement of the card 1 toward the predetermined card mounting position, the sliding boss 12 included in the slider 8 slides on the outer wall 43 of the slider receiving portion 41, thereby realizing the smooth movement of the slider 8. That is, it is possible to smoothly move the card 1 to the predetermined card mounting position, and to secure the good inserting and extracting operations of the card 1.

Moreover, when the card 1 is at the predetermined card extracting position, the sliding boss 12 of the slider 8 is pressed down by the elastic portion 7. Therefore, when the force to withdraw the card 1 is not applied, the protruding portion 11 of the slider 8 engages with the recessed portion 3 of the card 1 by the urging force of the elastic portion 7, and thus it is possible to prevent the card 1 from being separated from the insertion portion 40 of the card 1 due to vibration. Accordingly, it is possible to obtain a connector device having high reliability.

Also, according to the present invention, in a state in which at least a portion of the detecting switch 21 is mounted at the predetermined card mounting position, the detecting switch 21 is arranged so as to be situated in the space defined by the notch portion 2 of the card 1. Therefore, it is possible to reduce the space required to arrange the detecting switch 21, and thus it is possible to reduce the length and the width of the connector device, thereby miniaturizing the connector device.

In addition, the movable contact member forming the switch 21 is composed of the torsion coil spring 24, and the torsion coil spring 24 can be inexpensively manufactured relative to a plate spring. Therefore, it is possible to reduce the manufacturing costs of the connector device.

Furthermore, it is possible to reliably detect that the card 1 is mounted at the predetermined card mounting position through the bending deformation of the torsion coil spring 24, thereby securing good detecting precision.

Moreover, the connector device includes the actuator 27, and the electrical connection between the torsion coil spring 24 and the second stationary contact member 23 can be reliably achieved by the rotation of the actuator 27. In other words, the torsion coil spring 24 can be reliably bent by the actuator 27, thereby securing the detecting precision.

Also, the connector device includes the raised piece 28 corresponding to the entire thickness of the torsion coil spring 24. Therefore, the first stationary contact member 22 and the second stationary contact member 23 can be formed of simple flat members. Accordingly, it is possible to easily manufacture the first and second stationary contact members 22 and 23, and to reduce the manufacturing costs.

As described above, according to the present invention, it is possible to reduce the length and the width of the connector device, and to miniaturize the connector device, which cannot be realized by the conventional technique.

What is claimed is:

1. A card connector device, comprising:

an insertion portion into which a card having a notch portion is inserted, the notch portion being provided at a corner adjacent to a leading end of the inserted card; and a detecting switch for detecting that the card inserted into the insertion portion is mounted at a predetermined card mounting position, wherein the detecting switch is disposed so that at least a portion of the detecting switch is positioned in a space defined by the notch portion of the card mounted at the predetermined card mounting position.

2. The connector device according to claim 1, wherein the detecting switch includes a movable contact member composed of a torsion coil spring.

3. The connector device according to claim 2, wherein the detecting switch includes a first stationary contact member always electrically connected to the torsion coil spring and a second stationary contact member selectively electrically connected to the torsion coil spring, and wherein the first stationary contact member and the second stationary contact member are integrally formed with each other before a housing constituting the insertion portion is insert-molded, and after the insert molding, the first stationary contact member and the second stationary contact member are separated from each other by an aperture formed by cutting.

4. The connector device according to claim 3, further comprising an actuator that is rotated by insertion and extraction of the card to make the torsion coil spring bent.

5. The connector device according to claim 3, further comprising a raised piece always electrically connected to the second stationary contact member and selectively connected to the torsion coil spring.

6. The connector device according to claim 1, further comprising an extracting mechanism for extracting the card inserted into the insertion portion, wherein the card includes recessed portions, wherein the extracting mechanism includes a slider that moves in the inserting and extracting directions of the card and presses the card out, and an urging member for urging the slider toward the extracting direction, wherein the slider includes a protruding portion engaging with one of the recessed portions of the card, is disposed so that disengagement of the protruding portion from the recessed portion is restricted at the predetermined card mounting position, and is disposed so that the protruding portion disengages from the recessed portion at a predetermined card extracting position, and wherein the device further comprises an elastic portion for urging the slider in a direction in which the protruding portion of the slider engages with the recessed portion of the card at the predetermined card extracting position.

7. The connector device according to claim 6, wherein a slider receiving portion for receiving the slider is provided on the side of the insertion portion, and an outer wall constituting the slider receiving portion has a notch portion for allowing the elastic portion to press the slider.

8. The connector device according to claim 6, wherein the slider includes a sliding boss that is positioned opposite to the protruding portion, slides on the outer wall of the slider receiving portion, and is urged by the elastic portion at the predetermined card extracting position.

9. The connector device according to claim 6, further comprising a metal cover member for covering the insertion portion, wherein the elastic portion is composed of a cantilever-shape cut and raised piece that is formed by cutting and raising a portion of the cover member.

10. A card connector device, comprising:

an insertion portion into which a card having a notch portion is inserted; and a detecting switch for detecting that the card inserted into the insertion portion is mounted at a predetermined card mounting position, wherein the detecting switch is disposed so that at least a portion of the detecting switch is positioned in a space defined by the notch portion of the card mounted at the predetermined card mounting position, and wherein the detecting switch includes a movable contact member composed of a torsion coil spring.

11. The connector device according to claim 10,
wherein the detecting switch includes a first stationary contact member always electrically connected to the torsion coil spring and a second stationary contact member selectively electrically connected to the torsion coil spring, and
wherein the first stationary contact member and the second stationary contact member are integrally formed with each other before a housing constituting the insertion portion is insert-molded, and after the insert molding, the first stationary contact member and the second stationary contact member are separated from each other by an aperture formed by cutting.

12. The connector device according to claim 11, further comprising an actuator that is rotated by insertion mid extraction of the card to make the torsion coil spring bent.

13. The connector device according to claim 11, further comprising a raised piece always eclectically connected to the second stationary contact member and selectively connected to the torsion coil spring.

14. A card connector device, comprising:
an insertion portion into which a card having a notch portion is inserted;
a detecting switch for detecting that the card inserted into the insertion portion is mounted at a predetermined card mounting position; and
an extracting mechanism for extracting the card inserted into the insertion portion,
wherein the detecting switch is disposed so that at least a portion of the detecting switch is positioned in a space defined by the notch portion of the card mounted at the predetermined card mounting position,
wherein the card includes recessed portions,
wherein the extracting mechanism includes a slider that moves in the inserting and extracting directions of the card and presses the card out, and an urging member for urging the slider toward the extracting direction,
wherein the slider includes a protruding portion engaging with one of the recessed portions of the card, is disposed so that disengagement of the protruding portion from the recessed portion is restricted at the predetermined card mounting position, and is disposed so that the protruding portion disengages from the recessed portion at a predetermined card extracting position, and
wherein the device further comprises an elastic portion for urging the slider in a direction in which the protruding portion of the slider engages with the recessed portion of the card at the predetermined card extracting position.

15. The connector device according to claim 14,
wherein a slider receiving portion for receiving the slider is provided on the side of the insertion portion, and an outer wall constituting the slider receiving portion has a notch portion for allowing the elastic portion to press the slider.

16. The connector device according to claim 14,
wherein the slider includes a sliding boss that is positioned opposite to the protruding portion, slides on the outer wall of the slider receiving portion, and is urged by the elastic portion at the predetermined card extracting position.

17. The connector device according to claim 14, further comprising a metal cover member for covering the insertion portion,
wherein the elastic portion is composed of a cantilever-shape cut and raised piece that is formed by cutting and raising a portion of the cover member.

* * * * *